(12) United States Patent
Lee et al.

(10) Patent No.: US 6,641,794 B2
(45) Date of Patent: Nov. 4, 2003

(54) METHOD FOR PRODUCING BARIUM TITANATE BASED POWDERS BY OXALATE PROCESS

(75) Inventors: Jai Joon Lee, Suwon (KR); Kang Heon Hur, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 306 days.

(21) Appl. No.: 09/871,286

(22) Filed: May 31, 2001

(65) Prior Publication Data

US 2002/0048547 A1 Apr. 25, 2002

(30) Foreign Application Priority Data

Aug. 9, 2000 (KR) ........................................ 2000-46125

(51) Int. Cl.⁷ .............................................. C01G 23/00
(52) U.S. Cl. ............................... 423/598; 252/62.3 BT; 252/520.21
(58) Field of Search ............................ 423/598, 594.16, 423/417, 440, 437.1; 252/62.3 BT, 520.21

(56) References Cited

U.S. PATENT DOCUMENTS 4,061,583 A * 12/1977 Murata et al. ....... 252/62.3 BT
5,009,876 A    4/1991 Hennings et al.
5,783,165 A    7/1998 Wilson et al.

OTHER PUBLICATIONS

Zee Hoon Park, et al., Particle Size Control of Barium Titanate Prepared from Barium Titanyl Oxalate, J. Am. Ceram. Soc. 80 (6) 1599–604 (1997) No month.

H. Yamamura, et al., "Preparation of Barium Titanate by Oxalate Method in Ethanol Solution", Ceram. Int., 11, 1722 (1985) No month.

W. Stanley Clabaugh, et al., "Preparation of Barium Titanyl Oxalate Tetrahydrate for Conversion to Barium Titanate of High Purity", Journal of Research of the National Bureau of Standards, vol. 56, No. 5 (May 1956).

* cited by examiner

Primary Examiner—Stanley S. Silverman
Assistant Examiner—Edward M. Johnson
(74) Attorney, Agent, or Firm—Renner, Otto, Boisselle & Sklar, LLP (57) ABSTRACT

The method is carried out in the following manner: An aqueous mixture solution containing barium chloride and titanium chloride is added into an aqueous oxalic acid solution, so that barium titanyl oxalate would be precipitated. Then the precipitates are aged, washed and filtered. The filtered barium titanyl oxalate precipitates are crushed, and dried. Then a thermal decomposition is carried out to obtain a agglomerated barium titanate powder, and this is crushed again to obtain the final barium titanate powder. In order to obtain barium titanate based powder such as $Ba(Ti_{1-z}Zr_z)O_3$, $(Ba_{1-x}Ca_x)(Ti_{1-z}Zr_z)O_3$, and $(Ba_{1-x-y}Ca_xSr_y)(Ti_{1-z}Zr_z)O_3$, the desired elements (Ca, Sr, Zr and so on) are added to barium titanyl oxalate when crushed before thermal decomposition step. After thermal decomposition and crushing, the barium titanate based powder can be obtained.

31 Claims, 8 Drawing Sheets

PRIOR ART

PRIOR ART

FIG. 5A

PRIOR ART

FIG. 5B

METHOD FOR PRODUCING BARIUM TITANATE BASED POWDERS BY OXALATE PROCESS

FIELD OF THE INVENTION

The present invention relates to a method for preparing a barium titanate based powder by an oxalate process, the barium titanate based powder being used in various fields such as ferro-electric materials, ferro-piezoelectric materials and the like.

BACKGROUND OF THE INVENTION

The barium titanate based powder is one of the most important constituents of the electronic ceramics as dielectric materials. For example, the barium titanate based powders are widely used as raw materials for multi-layer ceramic chip capacitors(MLCC), positive temperature coefficient thermistors, piezoelectric devices, and the like.

They are conventionally produced by the dry-process that is mixing the powders of constituent elements and heating the mixture to high temperatures to cause a solid-phase reaction. The so-obtained powder consists of aggregates of irregular morphology, and usually requires high sintering temperature to achieve the desired characteristics. As the need of small size and large capacitance has been growing for electronic parts such as MLCC etc., it becomes important to prepare homogeneous, fine, and narrow size-distributed powder. Therefore the barium titanate based powders have been produced by wet-process like hydrothermal synthesis, oxalate method, alkoxide method, and so on.

In the hydrothermal synthesizing method, the process is very complicated because additional equipments like autoclave have to be used, and the productivity is somewhat low, so the prices of the obtained powders are high. Also, in the case of alkoxide method, the starting materials are difficult to handle, and their prices are very high. For these reasons, the barium titanate based powders are mostly manufactured by the oxalate method at present. The powders which are manufactured by the oxalate method have high purity, good morphology and reproducibility compared with the powders by the dry-process and other wet-process.

Figure 1:
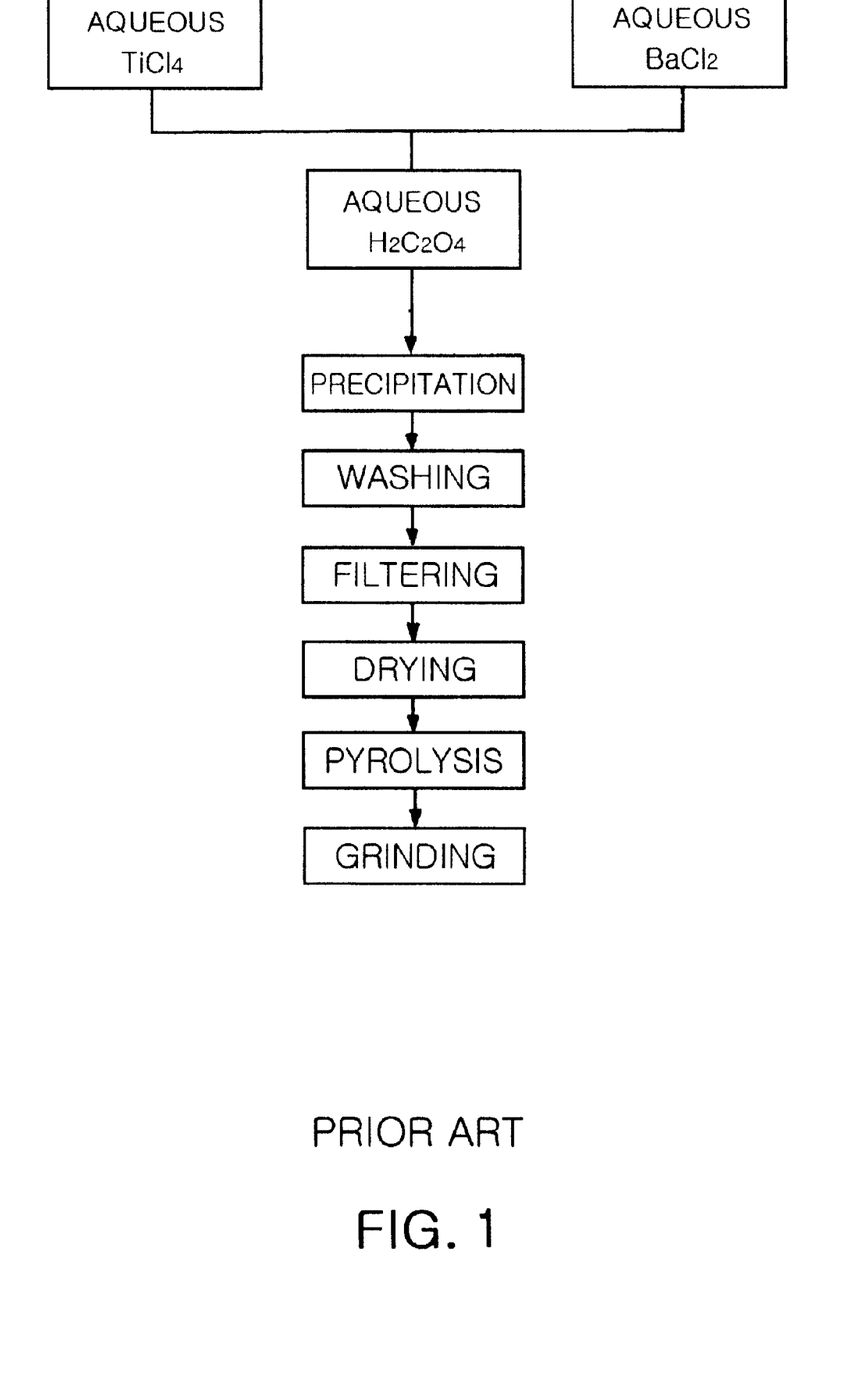
FIG. 1 illustrates the constitution of the conventional Clabaugh oxalate process for barium titanate powder.

The oxalate method was developed by Clabaugh ["Preparation of Barium Titanyl Oxalate Tetrahydrate for Conversion to Barium Titanate of High Purity", Journal of Research of the National Bureau of Standards, vol. 56, No. 5, pp. 289–291, 1956], and currently has been applied commercially to manufacture the barium titanate based powders. FIG. 1 illustrates the manufacturing process for the oxalate method by Clabaugh.

As shown in FIG. 1, barium chloride and titanium chloride are mixed together at around 1:1 ratio, and this mixture is added into oxalic acid, so that barium titanyl oxalate [$BaTiO(C_2O_4)_2 \cdot 4H_2O$] (to be called BTO below) is precipitated. Then the BTO is well washed, filtered and thermally decomposed at a temperature of about 800° C., thereby obtaining the barium titanate based powder.

However, hard aggregates between the particles are formed during the thermal decomposition(or calcination). The strong milling is needed to remove these hard aggregates. Because distribution of the particle size become very broad during this strong milling, the density may be reduced, and some dielectric properties are badly affected. Because the extremely fine particles are enormously produced during the strong milling, it is hard to disperse the powder for forming and abnormal grain growth can be observed during the sintering process.

In order to overcome the above described disadvantages, Hennings et al. disclosed a new method for manufacturing the barium titanate based powders in U.S. Pat. No. 5,009,876. In this method, the mixing sequence in the Clabaugh process is altered, in such a manner that an aqueous barium chloride solution is added to mixed aqueous solution of oxalic acid and $TiOCl_2$ at about 55° C. They obtain the barium titanate powder with primary particles of 0.2–0.5 µm, and aggregate size of 3–30 µm.

As another example which is similar to that of Hennings, there is U.S. Pat. No. 5,783,165 of Wilson et al., in which discloses a new method for manufacturing the barium titanate powders that the Ba source is replaced to barium carbonate.

As another examples, Yamamura et al., disclosed a method in which they use (ethanol solution instead of water, thereby obtaining fine precipitates ["Preparation of Barium Titanate by Oxalate Method in Ethanol Solution", Ceramic International, vol. 11, No. 1, pp. 17–22, 1985], and further, Cho et al., have tried to obtain fine barium titanate particles with the replacement of the aging time and solvent ["Particle Size Control of Barium Titanate Prepared from Barium Titanyl Oxalate", Journal of the American Ceramic Society, vol. 80, No. 6, pp. 1599–1604, 1997].

In all the above described methods, however, the severe aggregation problem occurring in manufacturing $BaTiO_3$ cannot be essentially solved yet. Particularly, if the organic solvent instead of water is used to control the precipitate size, they will have some problems concerning cost and environment.

SUMMARY OF THE INVENTION

The present invention is intended to overcome the above described disadvantages of the conventional techniques.

Therefore it is an object of the present invention to provide a barium titanate based powder of which milling is easy, morphology is spherical, less-aggregated and uniform, and finally dielectric properties are superior through the revised oxalate method in this invention.

In achieving the above object, the method for manufacturing a $BaTiO_3$ powder using the revised oxalate method according to the present invention includes the steps of:

adding a mixture of an aqueous barium chloride solution and an aqueous titanium chloride solution to an aqueous oxalic acid solution thereby precipiting BTO;

separating the precipitated BTO;

crushing the BTO so as to prevent the BTO from being aggregated after a thermal decomposition process;

thermally decomposing the BTO to form a barium titanate powder; and crushing the barium titanate powder.

In another aspect of the present invention, the method for manufacturing a perovskite-type barium titanate based powder by an revised oxalate method according to the present invention includes the steps of:

adding a mixture of an aqueous barium chloride solution and an aqueous titanium chloride solution to an aqueous oxalic acid solution thereby precipitating barium titanyl oxalate;

separating the precipitated barium titanyl oxalate;

adding additives to the barium titanyl oxalate to replacing Ba or Ti sites of the barium titanate based powder;

crushing the mixture of said precipitated barium titanyl oxalate and additives to prevent the barium titanyl oxalate from being aggregated after a thermal decomposition process;

thermally decomposing the mixture of said precipitated barium titanyl oxalate and additives to form a perovskite-type barium titanate based powder; and crushing the perovskite-type barium titanate based powder.

BRIEF DESCRIPTION OF THE DRAWING

The above object and other advantages of the present invention will become more apparent by describing in detail the preferred embodiment of the present invention with reference to the attached drawings in which.

DESCRIPTION OF THE PREFERRED EMBODIMENT

The present invention will be described in detail referring to the attached drawings.

Figure 2A:
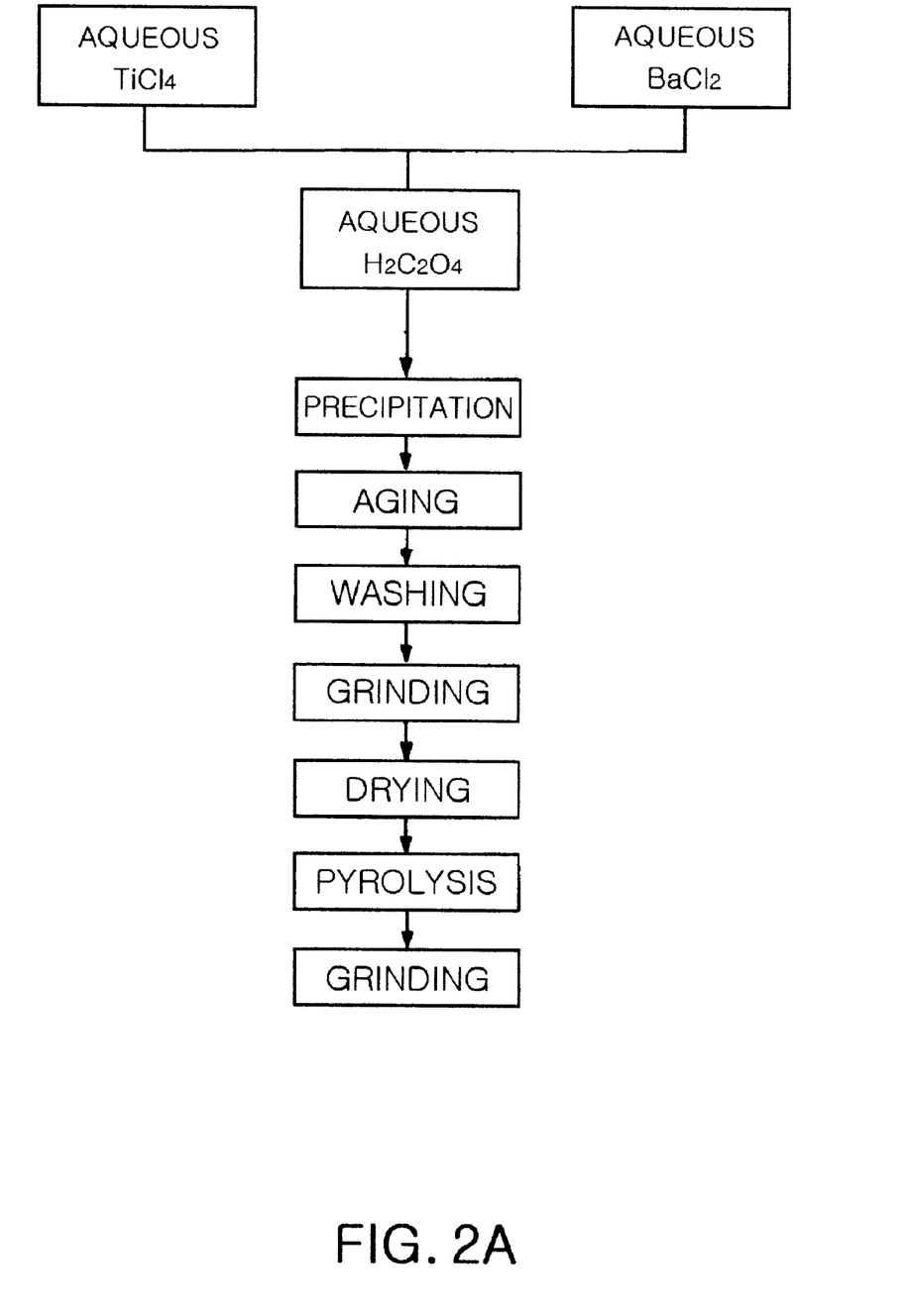
FIG. 2 illustrates the constitution of the manufacturing process for the barium titanate based powder according to the present invention.

FIG. 2a illustrates the constitution of the manufacturing process for the barium titanate powder according to the present invention. As shown in FIG. 2a, a mixed aqueous solution of barium chloride and titanium chloride is added to an aqueous oxalic acid solution so as to precipitate BTO. Under this condition, the aqueous barium chloride solution and the aqueous titanium chloride solution are preferably well mixed at a mole ratio of about Ba/Ti=1–1.5. For a concrete example, the aqueous barium chloride solution is used in such a manner that $BaCl_2 \cdot 2H_2O$ is dissolved in water, and the preferable concentration is about 0.2–2.0 mole/l. Meanwhile, the aqueous titanium chloride solution is used in such a manner that a $TiCl_4$ solution is added to chilled water, and its preferable concentration is about 0.2–2.0 mole/l. The aqueous oxalic acid solution has preferably a concentration of about 0.2–5.0 mole/l, and its temperature is preferably about 20–100° C. If the mixed aqueous solution of barium chloride and titanium chloride is added drop by drop with a burret to an aqueous oxalic acid solution, the addition rate is preferably about 1–20 ml/min. If the addition is made through a nozzle, the addition rate is preferably about 10–500 ml/min.

Then the precipitated BTO in solution is separating; i.e., it is aged, filtered and washed. Under this condition, the aging is preferably carried out for about 1–100 hours, the solution is filtered, the so-obtained precipitate is washed with water, and then the BTO precipitate is obtained.

Figure 3A:
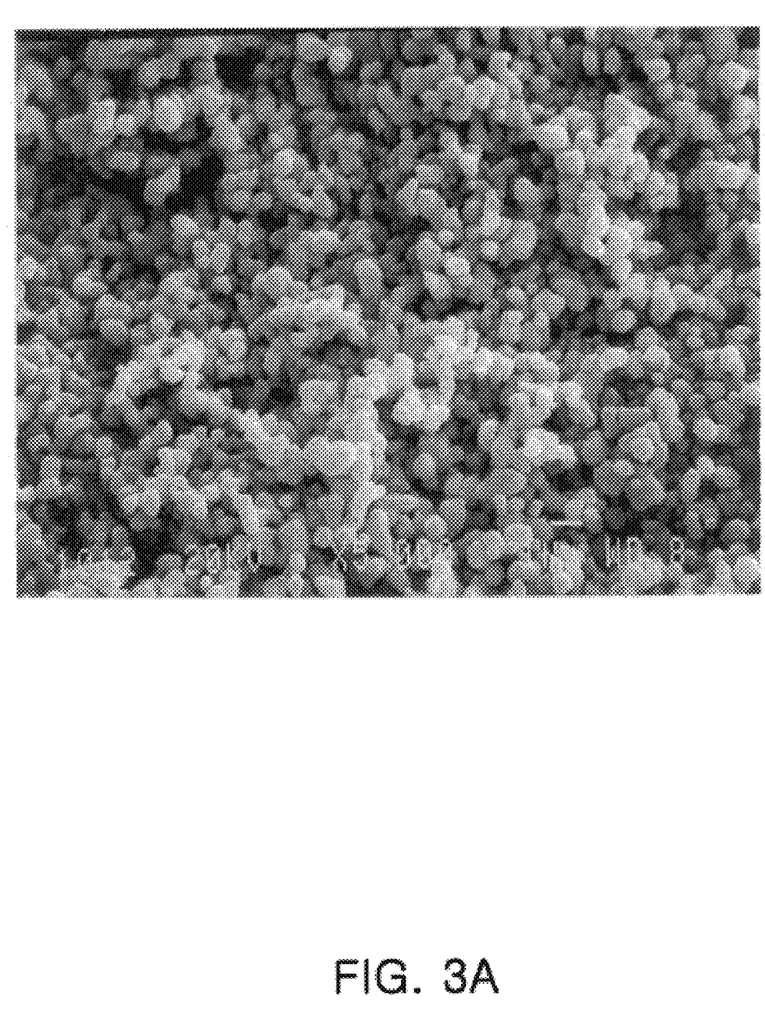
FIG. 3a is a SEM image of the barium titanate powder showing the state after calcination according to the present invention.

The next step is crushing the BTO. If the BTO precipitate is thermally decomposed without this step, the hard-aggregated $BaTiO_3$ powder is obtained as shown in FIG. 3a. Many researchers have tried to solving the aggregation problems in making $BaTiO_3$ powder through oxalate method, but the problems have not been essentially solved yet. In the present invention, however, it become possible to prevent the $BaTiO_3$ powder from being aggregated through the process that the BTO precipitate is crushed before the thermal decomposition.

The crushing before the thermal decomposition may be any kind of method. That is, the crushing machine may be one of wet-mill such as planetary mill, attrition mill, ball mill, beads mill, and the like, or it may be one of dry-mill such as atomizer, jet mill and the like. The important matter is that the mean particle size of the crushed BTO should be 5 $\mu$m or less, and preferably 0.1–3 $\mu$m.

However, it is desirable to use the wet-mill for crushing the BTO precipitates before the thermal decomposition because it is more efficient than the dry-mill for making the particle size of the BTO crystals 5 $\mu$m or less. When BTO precipitate is crushed by the wet-mill, it is preferable that water is to be added more than twice as much as the weight of the precipitates for efficient crushing which is possible only when the proper viscosity is maintained. The amount of water may be slightly reduced, however, if a small amount of a dispersing agent is added so as to make the BTO precipitates more easily dispersed in the water.

It is also an important step to dry the wet-crusded BTO slurry. When the precipitation reaction is occurred in a solution, some impurities are occluded into the precipitate, and the faster the precipitation is, the more impurities are occluded. Accordingly, no matter how thoroughly the BTO precipitate is filtered and washed in making $BaTiO_3$ through an oxalate process, the impurities like oxalic acid and the chlorine ions still remain in the precipitate. If chlorine ions remain in the BTO, then barium chloride, which has lower melting point, may be formed during the thermal decomposition step, then it may cause a liquid-phase sintering, and the $BaTiO_3$ powder may become more aggregated during the calcination. Also, the residual chlorine ions is detrimental to the properties of the powder. In the present invention, however, the chloride ions are less occluded compared with other conventional oxalate methods because the occluded chloride ions in the precipitate liberate by wet-crushing and may be almost removed by drying the wet-milled slurry at about 100–450° C.

The wet-crushed BTO slurry can be dried in an oven, but more preferably, it is spray-dried. The spray drying is carried out in a spray drier in such a manner that the BTO slurry is dropped onto a disc which rotates at a high speed, while a hot air is blown around the disc. That is, if the slurry is dropped onto the disc, then the fine drops of the BTO slurry are scattered in the drier and dried by the hot air. The rotation speed of the disc is preferably about 5,000–20,000 rpm, and the hot air is at least 100° C., and preferably 100–450° C.

The spry-dried BTO is subjected to a calcination, i.e., to a thermal decomposition, thereby obtaining the $BaTiO_3$ powder. The heating rate is preferably about 0.5–10° C./min, and the calcination temperature is preferably about 700–1,200° C.

The obtained $BaTiO_3$ powder is made to undergo another crushing process, thereby obtaining the final product.

As can be verified in the actual examples, the barium titanate powder produced by the new oxalate method of this invention is uniform in its particle size, is spherical in the morphology. Further, its dielectric properties are superior, X7R capacitor specifications of the EIA is satisfied, and therefore, it is suitable for the dielectric raw material for MLCC.

Figure 2B:
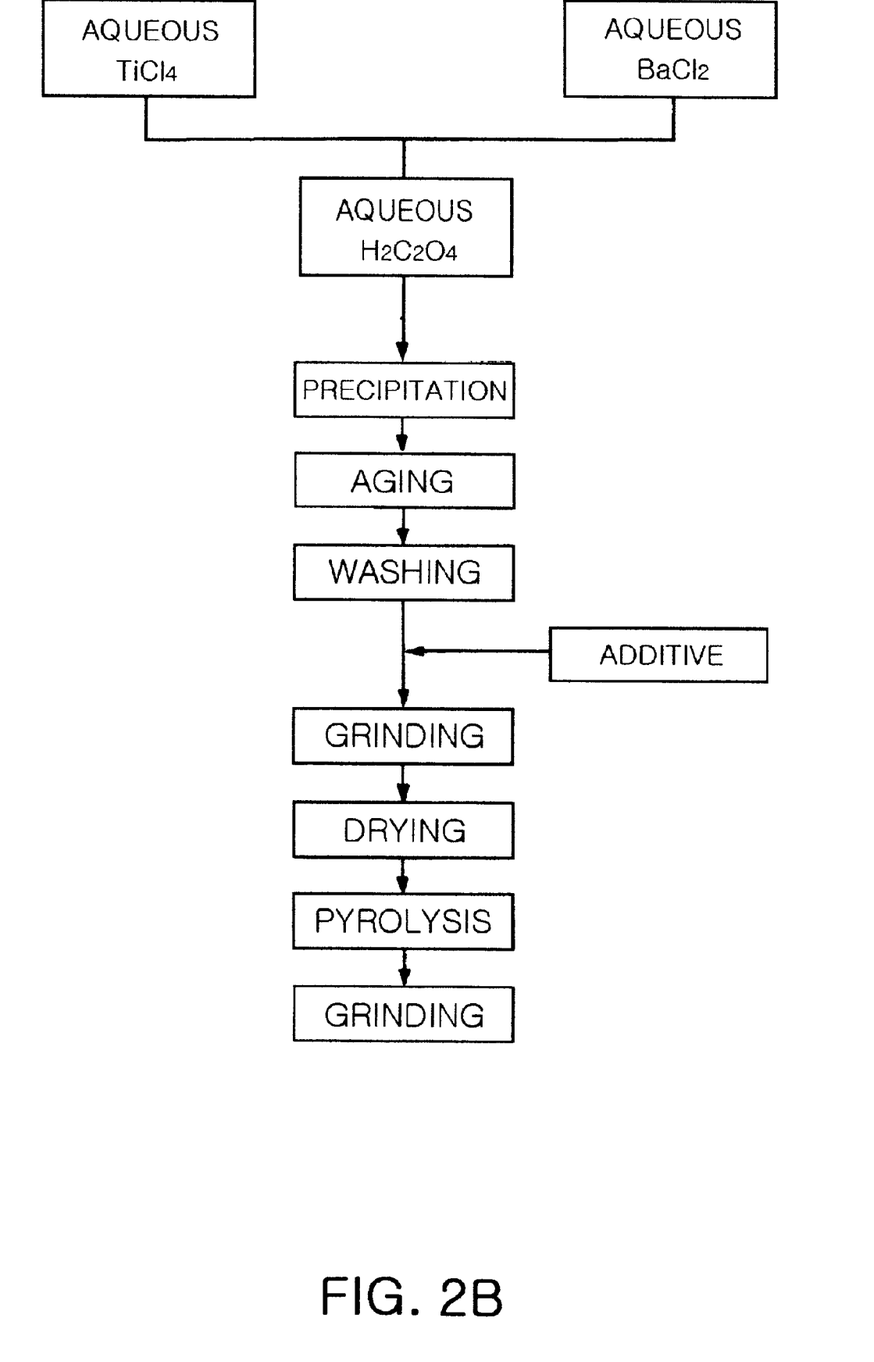

Also, a process for producing a $ABO_3$ perovskite-type barium titanate based oxide, where A is Ba and at least one element selected from the group containing Mg, Ca, Sr, and Pb; and B is Ti and at least one element selected from the group containing Zr, Hf, and Sn, is disclosed. As shown in FIG. 2b, only one step is added to the process for making $BaTiO_3$ powder(FIG. 2a) of this invention. That is, when BTO precipitate is crushed before thermal decomposition, one or more elements among the above elements are crushed together in the form of oxide, carbonate, nitrate and chloride. Then perovskite-type barium titanate based powders such as $Ba(Ti_{1-z}Zr_z)O_3$, $(Ba_{1-x}Ca_x)(Ti_{1-z}Zr_z)O_3$, and $(Ba_{1-x-y}Ca_xSr_y)(Ti_{1-z}Zr_z)O_3$ can be obtained. Some perovskite-type barium titanate based powders which satisfy Y5R or Z5U capacitor specifications of EIA are very suitable as a dielectric material for the MLCC. The doping amount of the additive can be decided in accordance with the desired final powder composition. For example, the elements for A in $ABO_3$ are added in an amount of 1~30 at. % of Ba, while the elements for B are added in an amount of 1~100 at. % of Ti.

Now the present invention will be described based on actual examples, but it should be apparent that the present invention will not be limited by the actual examples specified below. For example, the kind and amount of the additives can be varied in accordance with the desired powder composition.

EXAMPLE 1

Inventive Example 1

An aqueous $TiCl_4$ solution having a concentration of 1 mol/l in an amount of 0.8 l was mixed with 0.84 l of an aqueous $BaCl_2$ solution having a concentration of 1 mol/l, thereby forming a mixture solution. Then this mixture solution was drop by drop added to 2.5 l of an oxalic acid solution having a concentration of 1 mol/l while carrying out an agitation. Under this condition, the temperature of the oxalic acid was about 70° C., and the addition rate was 5~10 ml/min. After the dropping of the mixture solution is finished, a reaction was let to be continued for about 30 minutes, then the agitation was stopped, and the solution was cooled in air for about 5 hours for aging of the BTO precipitates.

Then the BTO precipitates thus obtained were washed with water, and were filtered. Then the so-obtained BTO precipitates was added to water to form a slurry in a ratio of water/BTO=3/1 by wt %, and then, a crushing was carried out in a planetary mill in such a manner that the mean particle size would become 0.8 $\mu$m or less.

The crushed slurry was dryed in a spry dryer where inlet temperature was at about 240° C., the revolution speed of the disc was about 800 rpm. Thereafter, the dried BTO were calcined in an electric furnace at about 1,060° C., and then, a crushing was carried out again in a planetary mill for about 30 minutes, thereby obtaining a $BaTiO_3$ powder.

The $BaTiO_3$ powder thus manufactured showed an mean particle size of about 0.88 $\mu$m, and its specific surface area (BET) was 2.2 $m^2/g$.

Figure 3B:
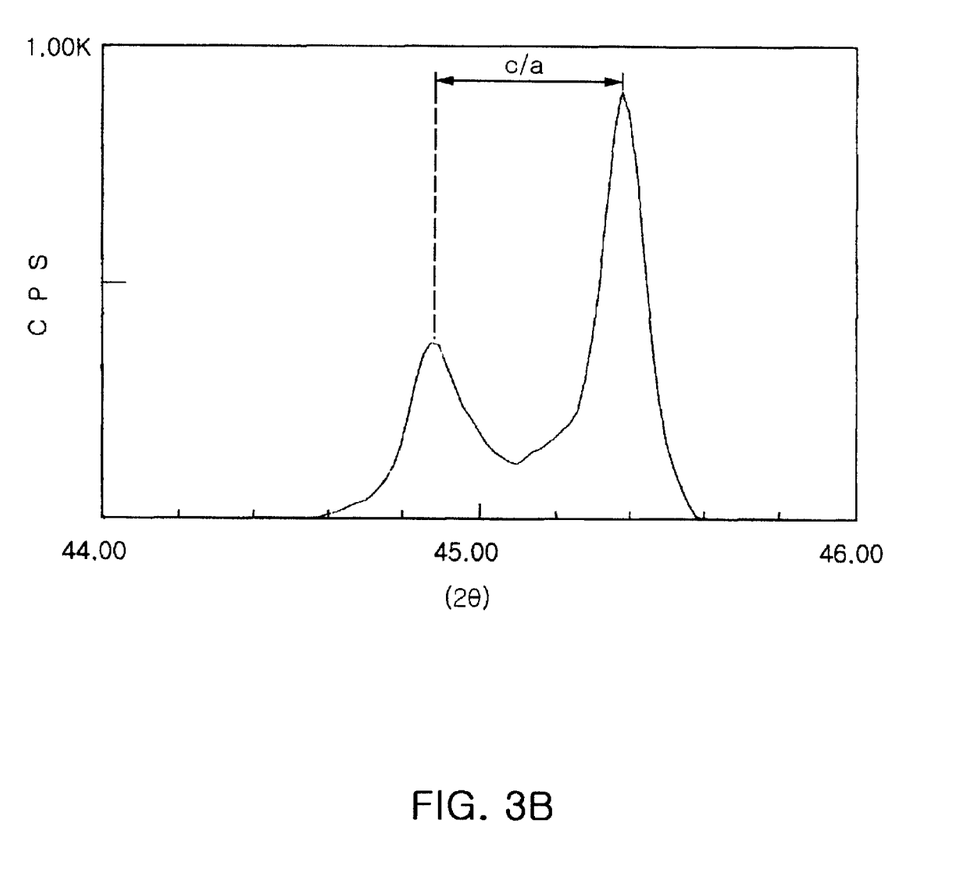
FIG. 3b is a XRD of the barium titanate powder showing the state after calcination according to the present invention.

FIG. 3a is an SEM image showing the state after the calcination of the barium titanate powder according to the present invention. Further, in XRD analysis of FIG. 3b, the powder of the present invention showed a K-factor and c/a of 7.95 and 1.0105 respectively.

Conventional Example 1

An aqueous mixed solution of $TiCl_4$ and $BaCl_2$ was added to an oxalic acid solution in same conditions as those of example 1, thereby obtaining a BTO precipitated solution. Then the BTO precipitates were washed, was filtered, and was calcined at temperature of about 1,060° C., without the crushing process. Then the thermally decomposed $BaTiO_3$ powder was crushed by a planetary mill, and so $BaTiO_3$ powder was prepared.

The $BaTiO_3$ powder thus manufactured showed an mean particle size of about 0.9 $\mu$m, and a specific surface area (BET) of about 2.50 $m^2/g$.

Figure 5A:
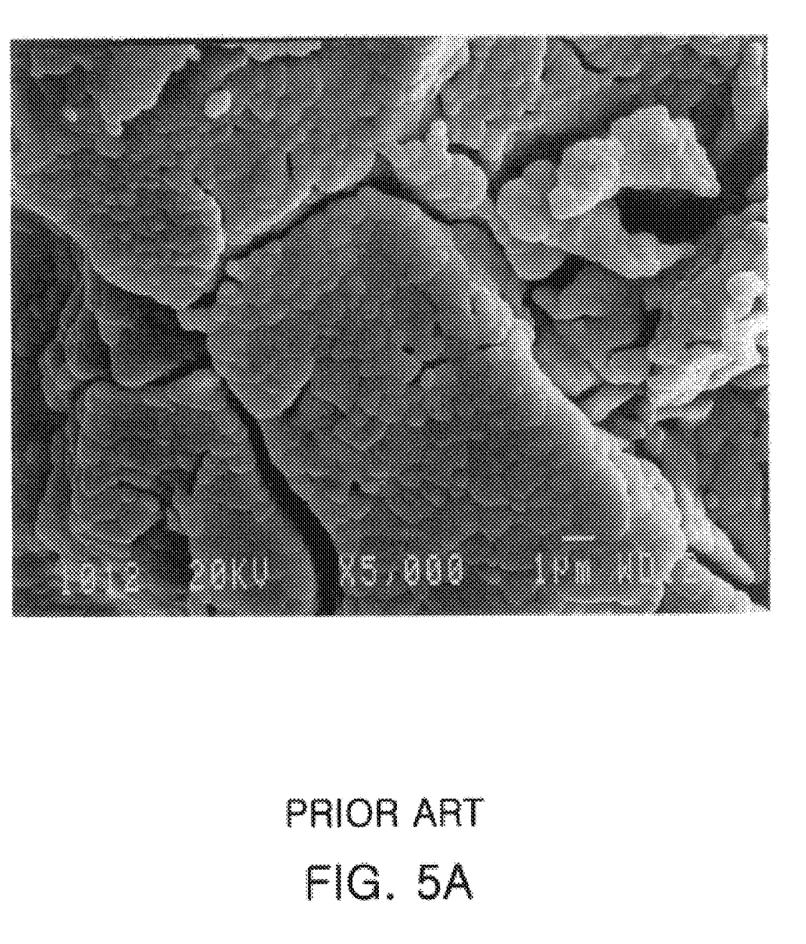
FIG. 5a is a SEM image of the barium titanate powder calcinated by the conventional oxalate process.
Figure 5B:
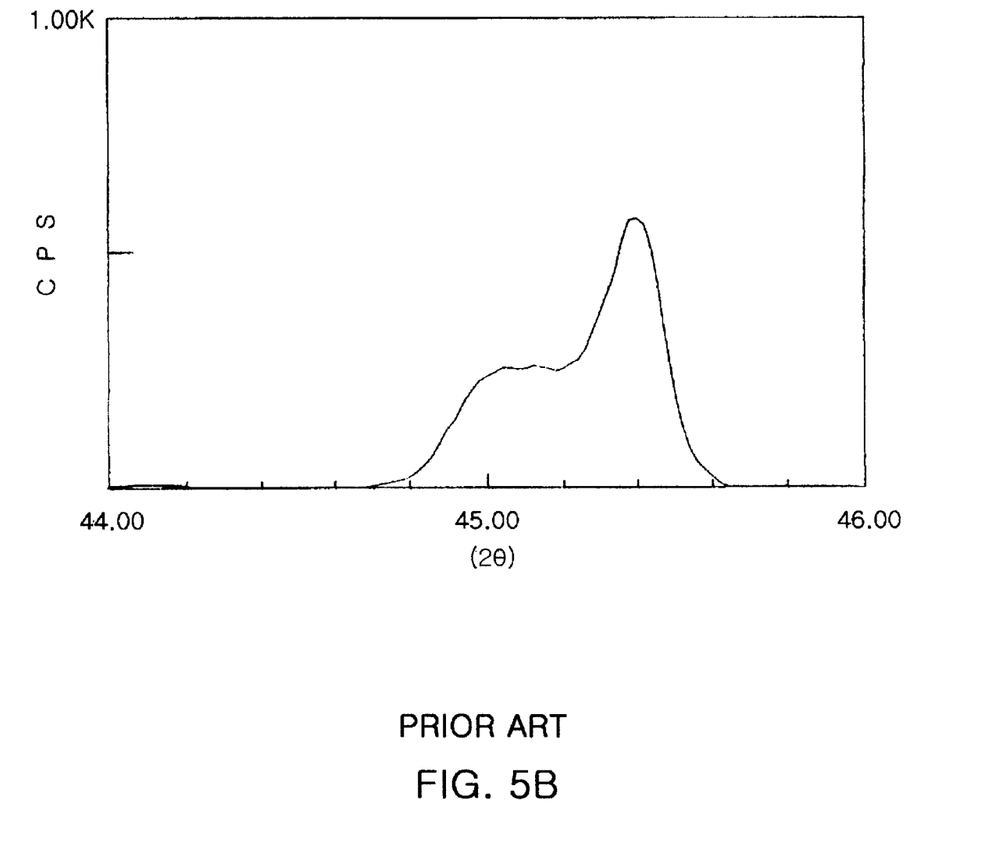
FIG. 5b is a XRD of barium titanate powder calcinated by the conventional oxalate process.

FIG. 5a is an SEM imaging after calcination of barium titanate powder according to the conventional method. As shown in this photograph, strong aggregates were formed among the particles after the calcination, and even if they were crushed at the next step, the particles were sharp-edged, the particle size distribution was very broad. In a XRD analysis of FIG. 5b, this powder prepared by the conventional method showed a K-factor and c/a of about 2.35 and about 1.0100 respectively. Thus the powder characteristics were significantly bad compared with the powder of the present invention.

EXAMPLE 2

Using the two kind (inventive and conventional) of powder of Example 1 and some dopants for X7R, two kinds of MLCC (In ex. 1 and co ex. 1) were produced having a capacitance of 10 nF.

Then for these two kinds of MLCC, dielectic characteristics (capacitance, dissipation factor(DF), insulation resistance(IR), temperature coefficient of capacitance), and the reliablity (high temperature resistance, moisture resistance, temperature cycle, resistance to soldering heat and accelerated life) were tested. The test results are shown in Table 1 below.

The conditions of the reliability test is follows; high temperature resistance, 1000 hours/2 ×Vr(rated voltage)/125° C.; moisture resistance, 500 hours/Vr/95% relative humidity 40° C.; temperature cycle, 10 cycles from –55° C. to 125° C.; resistance to soldering heat, 10 seconds/290° C. in the soldering bath; accelerated life, 96 hours/8×Vr/140° C.

TABLE 1

| Classification | C (nF) | loss (%) | IR ($10^{11}$ Ω) | TCC (%) | high temperature resistance (each) | moisture resistance (each) | Temperature cycle (each) | Resistance to soldering (each) | Failure (fit) |
|---|---|---|---|---|---|---|---|---|---|
| In ex 1 | 12.9 | 1.50 | 0.70 | −2.81/−8.4 | 0/20 | 0/20 | 0/20 | 0/20 | 0.45(1) |
| Co ex 1 | 12.6 | 1.94 | 1.11 | −6.5/−10.7 | 3/20 | 3/20 | 5/20 | 2/20 | 4.18(1) |

As shown in Table 1 above, in the case of the MLCC which was manufactured by using the $BaTiO_3$ powder of the present invention compared with the MLCC made by the conventional method, the almost characteristics were superior, thereby ensuring a high reliability.

EXAMPLE 3

BTO precipitate was obtained at the same conditions as those of Example 1. However, at the crushing step before the thermal decomposition, the additives such as $BaCO_3$, $CaCO_3$, $SrCO_3$ and $ZrO_2$ were added. Then these BTO precipitate and additives were crushed, dried and calcined at 1,150° C., and the so-obtained powder were crushed again, thereby obtaining $(Ba_{0.843}Ca_{0.07}Sr_{0.09})(Ti_{0.84}Zr_{0.16})O_3$ powders.

Figure 4:
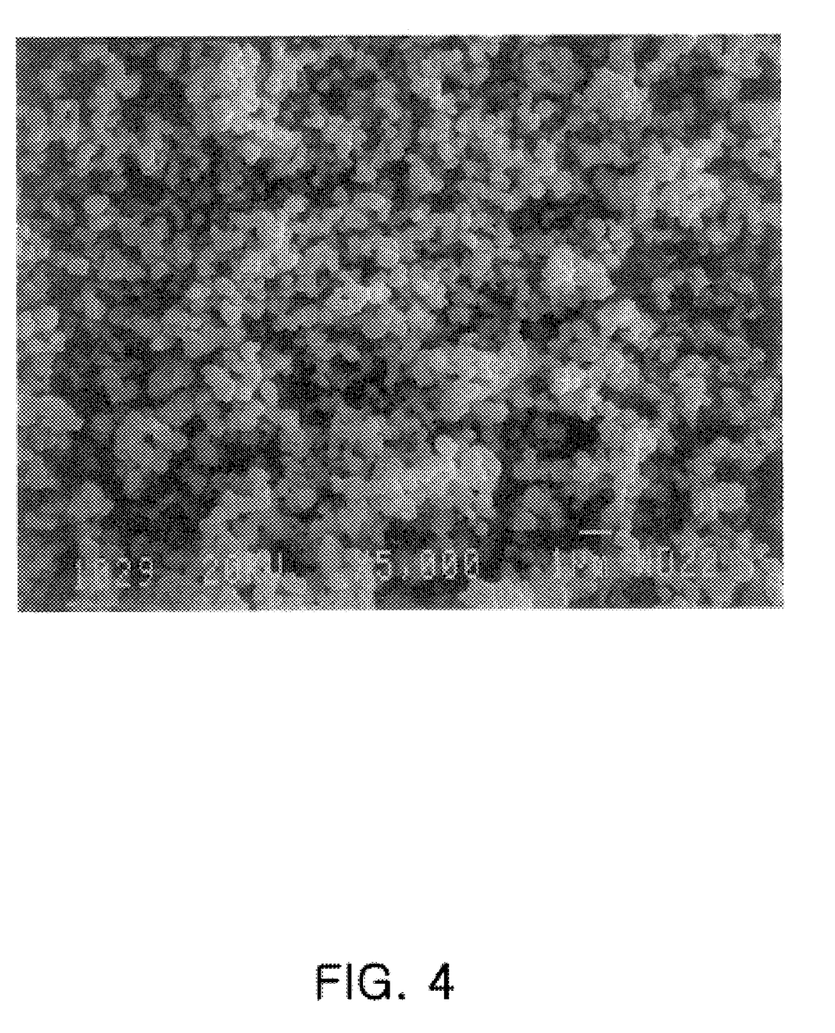
FIG. 4 is a SEM image of barium titanate based powder showing the state after the calcination according to the present invention.

The perovskite-type oxide powders obtained in this manner were tested as to their properties, and the result was that the powder of the present invention showed an mean particle size of about 0.55 μm and a specific surface area of about FIG. 4 is a SEM image showing a state after the calcination of the above barium titanate based powder according to the present invention. As is apparent in this drawing, the powder with a good morphology and a uniform particle size distribution could be obtained.

EXAMPLE 4

A PVA binder and some dopants for Y7V were added to the powder of Example 3, and the mixture was well mixed in an alumina mortar and dried. Then the mixture was crushed in the mortar and sieved in order to obtain the granules. After about 0.4 g of the granules were weighed, and pressed into a Φ 10 mm disc in a mold. Then some dielectric properties were tested, and the test results are shown in Table 2 below.

TABLE 2

| Classification | Green Density (g/cm³) | Sintering density (g/cm³) | Dielectric constant | Dielectric loss (%) | Insulating resistance ($10^{11}$ Ω) | TCC (%) |
| --- | --- | --- | --- | --- | --- | --- |
| Inventive Example 2 | 3.79 | 5.85 | 10,250 | 0.88 | 2.07 | −68.2/20.9 |

As can be seen in Table 2 above, the powder of the present invention will be well satisfied the Y5V characteristic.

EXAMPLE 5

BTO crystals were obtained in the same conditions as those of Example 1. However, at the crushing step before the thermal decomposition, the additives such as $CaCO_3$ and $ZrO_2$ were added. Then these BTO precipitate and additives were crushed, dried and calcined at 1,150° C., and the so-obtained powder were crushed again, thereby obtaining $(Ba_{0.952}Ca_{0.05})(Ti_{0.84}Zr_{0.16})O_3$ powders.

The perovskite-type oxide powder obtained in this manner were tested as to their properties, and the result was that the powder of the present invention showed an mean particle size of about 0.52 μm and a specific surface area of 4.02 m²/g.

By using this powder, discs were formed in the same manner as that of Example 4, and some dielectric properties on them were tested, the test results being shown in Table 3 below.

TABLE 3

| Classification | Green density (g/cm³) | Sintering density (g/cm³) | Dielectric constant | Dielectric loss (%) | Insulating resistance ($10^{11}$ Ω) | TCC(%) |
| --- | --- | --- | --- | --- | --- | --- |
| Inventive example 3 | 3.69 | 5.90 | 12,100 | 3.72 | 0.44 | −60.3/10.2 |

As can be seen in Table 3 above, the powder of the present invention will be well satisfied the Y5V characteristic.

According to the present invention as described above, a crushing step and drying step before the thermal decomposition are applied, and therefore, the occlusion of chlorine ions into the powder particles is low, its morphology is close to spherical shape, and the dielectric properties are improved, with the result that the barium titanate based powders prepared by this invention is well qualified for MLCC.

What is claimed is:

1. A method for manufacturing a barium titanate powder by an oxalate process, comprising the steps of:
    adding a mixture of an aqueous barium chloride solution and an aqueous titanium chloride solution to an aqueous oxalic acid solution, thereby precipitating barium titanyl oxalate;
    separating the precipitated barium titanyl oxalate;
    crushing said precipitated barium titanyl oxalate to prevent said barium titanyl oxalate from being aggregated after a thermal decomposition process;
    thermally decomposing said barium titanyl oxalate to form a barium titanate powder; and
    crushing said barium titanate powder.

2. The method as claimed in claim 1, wherein said aqueous barium chloride solution has a concentration of about 0.2–2.0 mol/l.

3. The method as claimed in claim 1, wherein said aqueous titanium chloride solution has a concentration of about 0.2–2.0 mol/l.

4. The method as claimed in claim 1, wherein said mixture has a mole ratio of about 1–1.5 of the barium chloride to the titanium chloride.

5. The method as claimed in claim 1, wherein said aqueous oxalic acid solution has a concentration of about 0.2–5.0 mol/l.

6. The method as claimed in claim 1, wherein said precipitated barium titanyl oxalate is aged, washed and filtered.

7. The method as claimed in claim 1, wherein in the step of crushing said precipitated barium titanyl oxalate is applied to a wet crushing.

8. The method as claimed in claim 7, wherein said barium titanyl oxalate is additionally dried after said wet crushing.

9. The method as claimed in claim 8, wherein the drying is a spray drying.

10. The method as claimed in claim 1, wherein said precipitated barium titanyl oxalate is crushed to an mean particle size of about 5 μm or less before carrying out the thermal decomposition.

11. The method as claimed in claim 10, wherein said precipitated barium titanyl oxalate is crushed to an mean particle size of about 0.1–3 μm before carrying out the thermal decomposition.

12. The method as claimed in claim 1, wherein said precipitated barium titanyl oxalate before the thermal decomposition are made to undergo a wet crushing, a drying and a dry crushing.

13. The method as claimed in claim 1, wherein the thermal decomposition is carried out at a temperature of about 700–1,200° C. carrying out a heating at a heating rate of about 0.5–10° C./min.

14. A method for manufacturing a perovskite-type barium titanate based powder by an oxalate process, comprising the steps of:

adding a mixture of an aqueous barium chloride solution and an aqueous titanium chloride solution to an aqueous oxalic acid solution thereby precipitating barium titanyl oxalate;

separating the precipitated barium titanyl oxalate;

adding additives to said precipitated barium titanyl oxalate to substitute Ba or Ti positions;

crushing the mixture of said precipitated barium titanyl oxalate and additives to prevent said barium titanyl oxalate from being aggregated after a thermal decomposition process;

thermally decomposing said mixture of the precipitated barium titanyl oxalate and additives to form a perovskite-type barium titanate based powder; and crushing said perovskite-type barium titanate based powder.

15. The method as claimed in claim 14, wherein said aqueous barium chloride solution has a concentration of about 0.2–2.0 mol/l.

16. The method as claimed in claim 14, wherein said aqueous titanium chloride solution has a concentration of about 0.2–2.0 mol/l.

17. The method as claimed in claim 14, wherein said mixture of an aqueous barium chloride and titanium chloride solution has a mole ratio of about 1–1.5 of the barium chloride to the titanium chloride.

18. The method as claimed in claim 14, wherein said aqueous oxalic acid solution has a concentration of about 0.2–5.0 mol/l.

19. The method as claimed in claim 14, wherein said precipitated barium titanyl oxalate is aged, washed and filtered.

20. The method as claimed in claim 14, wherein in the step of crushing said mixture of the precipitated barium titanyl oxalate and additives is applied to a wet crushing.

21. The method as claimed in claim 20, wherein said mixture of the precipitated barium titanyl oxalate and additives is additionally dried after said wet crushing.

22. The method as claimed in claim 20, wherein the drying is a spray drying.

23. The method as claimed in claim 14, wherein said mixture of the precipitated barium titanyl oxalate and additives is crushed to have a mean particle size of about 5 μm or less before carrying out the thermal decomposition.

24. The method as claimed in claim 14, wherein said mixture of the precipitated barium titanyl oxalate and additives is crushed to have a mean particle size of about 0.1–3 μm before carrying out the thermal decomposition.

25. The method as claimed in claim 14, wherein before the thermal decomposition, said mixture of the precipitate barium titanyl oxalate and additives is made to undergo a wet crushing, a drying and a dry crushing.

26. The method as claimed in claim 14, wherein said thermal decomposition is carried out at a temperature of about 700–1,200° C. carrying out a heating at a rate of about 0.5–10° C./min.

27. The method as claimed in claim 14, wherein said additives contain at least one or more elements selected from among Mg, Ca, Sr and Pb to replace Ba site of barium titanate.

28. The method as claimed in claim 27, wherein said additives of replacing Ba site can be occupied 1~30 at. % relative to Ba.

29. The method as claimed in claim 14, wherein said additives contain at least one or more elements selected from among Zr, Hf and Sn to replace Ti site if barium titanate.

30. The method as claimed in claim 29, wherein said additives of replacing Ti site can be occupied 1~100 at. % relative to Ti.

31. The method as claimed in claim 14, wherein said additives can take a form of oxide, carbonate, chloride or nitrate.

* * * * *